United States Patent [19]

Stack et al.

[11] Patent Number: 5,040,327
[45] Date of Patent: Aug. 20, 1991

[54] POLYGONAL BAIT STATION

[75] Inventors: Malcolm G. Stack, Madison, Wis.; L. Dawn Brown, Richmond, Va.

[73] Assignee: Bell Laboratories, Inc., Madison, Wis.

[21] Appl. No.: 478,669

[22] Filed: Feb. 12, 1990

[51] Int. Cl.$^5$ .......................................... A01M 25/00
[52] U.S. Cl. ...................................... 43/131; 220/281
[58] Field of Search ................ 43/131; 220/4.21, 4.22, 220/4.23, 4.24, 281, 282, 283, 284; 52/127.7; 215/301, 302

[56] References Cited

U.S. PATENT DOCUMENTS

| | | |
|---|---|---|
| 2,977,711 | 4/1961 | Starr . |
| 3,075,627 | 1/1963 | Kuckhoff .......................... 220/4.21 |
| 3,965,609 | 6/1976 | Jordan . |
| 4,208,829 | 6/1980 | Manning . |
| 4,453,337 | 6/1984 | Williams . |
| 4,541,198 | 9/1985 | Sherman ............................... 43/131 |
| 4,550,525 | 11/1985 | Baker et al. . |
| 4,637,162 | 1/1987 | Sherman ............................... 43/131 |
| 4,648,201 | 3/1987 | Sherman . |
| 4,658,536 | 4/1987 | Baker . |
| 4,660,320 | 4/1987 | Baker et al. . |
| 4,706,808 | 11/1987 | Guetersloh ......................... 220/4.21 |
| 4,833,819 | 5/1989 | Sherman . |

FOREIGN PATENT DOCUMENTS

3537805C1 2/1987 Fed. Rep. of Germany .

*Primary Examiner*—Richard K. Seidel
*Assistant Examiner*—James Miner
*Attorney, Agent, or Firm*—Lathrop & Clark

[57] ABSTRACT

A bait station (10) used in the reduction of pest populations is polygonal, having a first wall (14) that is straight and adapted to fit against a room wall, a second wall (16) with two portions at right angles adapted to fit in a room corner, two threshold portions (20,22) extending between the first wall (14) and the second wall (16), and third wall portions (18) oriented in a direction parallel to adjacent portions of the second wall (16) to define a right-angle passageway (34) between the second wall (16) and the third wall portions (18) and a bait containment chamber (40) between the first wall (14) and the third wall portions (18). The threshold portions (20,22) have pest access entrances (36,38) leading to passageway (34). An opening (40) to the bait containment chamber (32) is formed at the bend in the passageway (34). The passageway (34) makes the pest comfortable by providing a sense of easy access and retreat. The threshold portions (20,22) are angled to allow the pest equally facilitated access whether the bait station (10) is positioned against a corner created by the intersection of two walls or against a straight segment of wall.

24 Claims, 3 Drawing Sheets

POLYGONAL BAIT STATION

FIELD OF THE INVENTION

This invention relates to bait stations in which rodents feed upon poisoned bait, causing the rodents to later succumb to the poison.

BACKGROUND OF THE INVENTION

Bait stations of various sizes and configurations are well-known in the art. Bait stations are used to present poisoned bait to rodent populations in a manner which induces the rodents to feed upon the poisoned bait. The poison contained within the bait is ordinarily slow-acting so that the rodents will not connect the illness of themselves and others to the bait station or the food that they have eaten.

Prior bait stations have been designed for placement on the floor in unobtrusive locations, such as along walls. Several prior art bait stations, such as those described in Jordan, U.S. Pat. No. 3,965,609 and Baker, U.S. Pat. Nos. 4,550,525 and 4,660,320, have been designed for placement in corners. Such prior bait stations have attempted to provide a passageway for the rodents which presents a visible and accessible path of ingress and egress, so that the rodents will not hesitate to enter the station. At the same time, however, it is equally important that the bait station design prevent access to the bait by inquisitive children and pets. Therefore, prior bait stations have incorporated mazes or passageways of various types. The bait stations that utilize such mazes and passageways, however, often do not provide the rodent with a visible escape route, thus limiting the acceptability of the station within a rodent population.

SUMMARY OF THE INVENTION

In accordance with the present invention, a bait station is disclosed which is designed to be placed upon the floor and unobtrusively fit against either a straight segment of a wall or in a room corner with minimum interference with rodent travel patterns. The bait station may alternately be placed in the open upon a floor. The bait station is a polygonal enclosure, with one of the angles of the enclosure forming an angle of 90° in order to fit against a room corner. Two of the sides of the enclosure are angled in such a manner that pests may easily access the bait station whether the bait station is placed against the wall or in a corner.

The bait station has a right angle passageway that leads between the angled pest access entrances. Rodents entering into the passageway can sense easy retreat through the access entrances both in front of and behind them. At the inside of the passageway at a right-angle bend, there is an opening to a bait containment chamber in which the poisoned bait is located. The pest access entrance is small enough to prevent a child from inserting his or her hand, or a pet from inserting its paw, into the passageway, and the distance between the pest access opening and the entrance to the bait containment chamber is great enough so that a child's finger would not reach the bait containment chamber.

The polygonal bait station is portable and of easily molded construction, having a base with a floor and walls that extend vertically upwardly from the floor to form the enclosure, the passageway, and the bait containment chamber, and a cover that fits over the top of the walls to enclose the bait station.

DESCRIPTION OF THE PREFERRED EMBODIMENT

Figure 1:
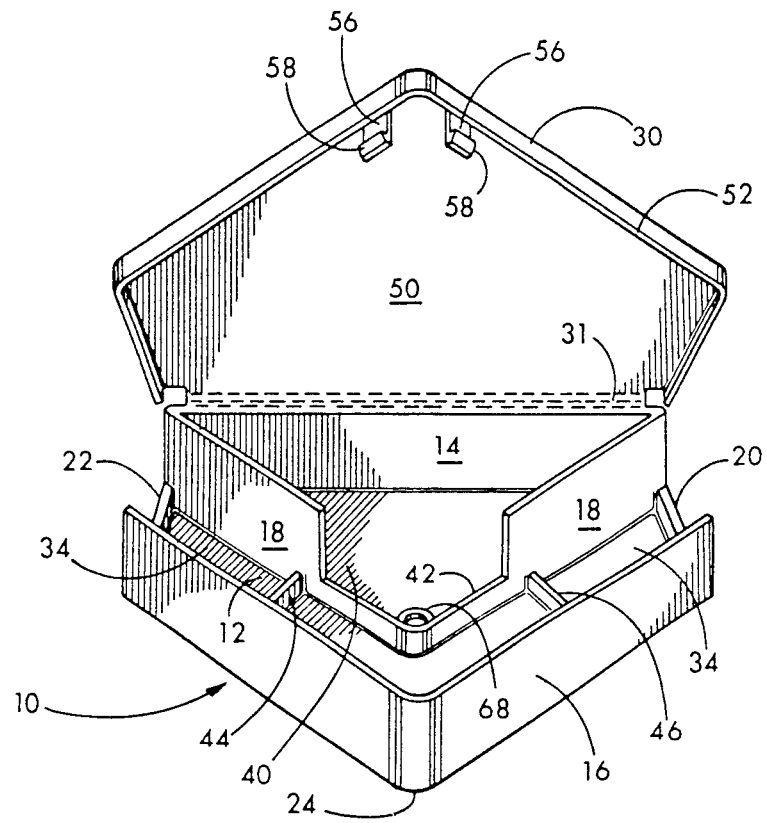
FIG. 1 is a front perspective view of the polygonal bait station of the present invention with a hinged cover being shown in an open position.
Figure 2:
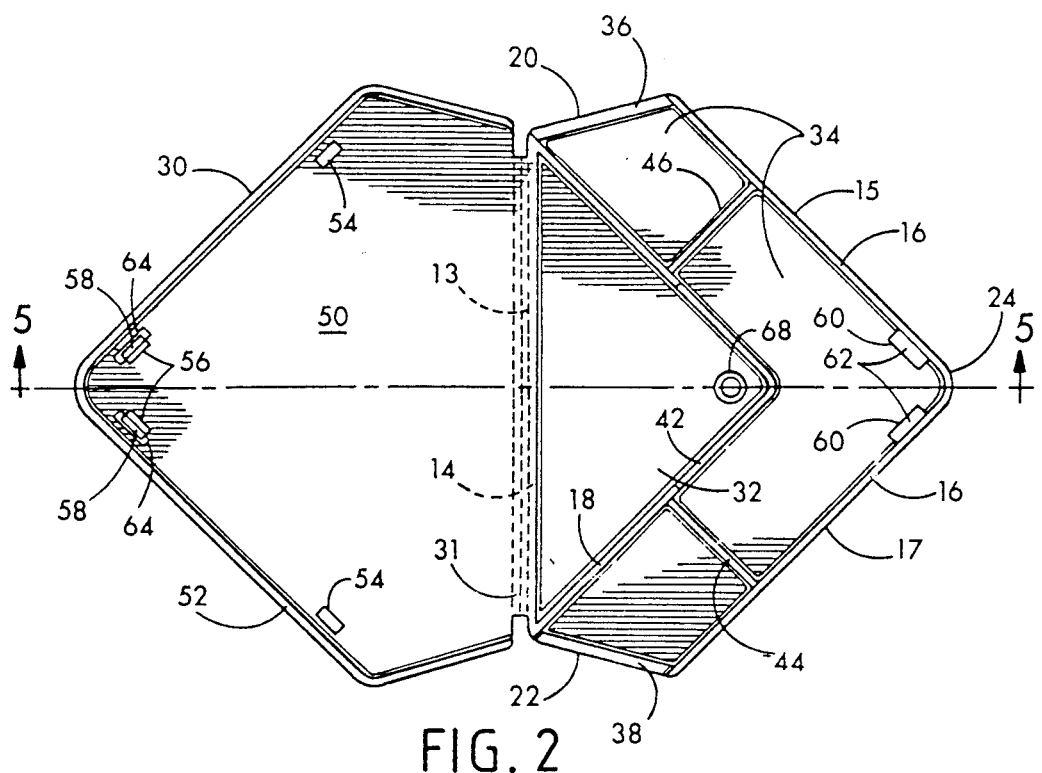
FIG. 2 is a top plan view of the base of the polygonal bait station with the hinged cover being shown in an open position.
Figure 3:
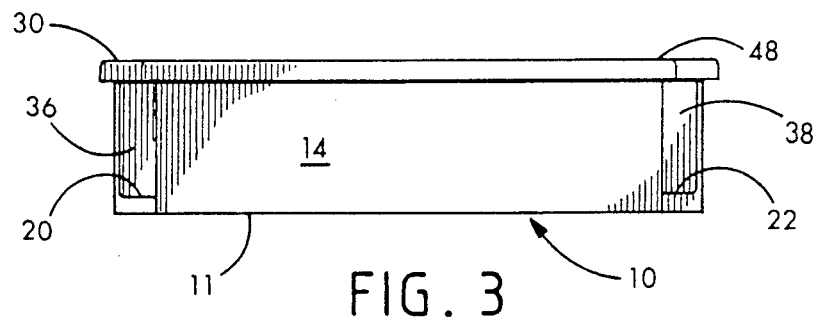
FIG. 3 is a back plan view of the polygonal bait station with the hinged cover being shown in a closed position.
Figure 4:
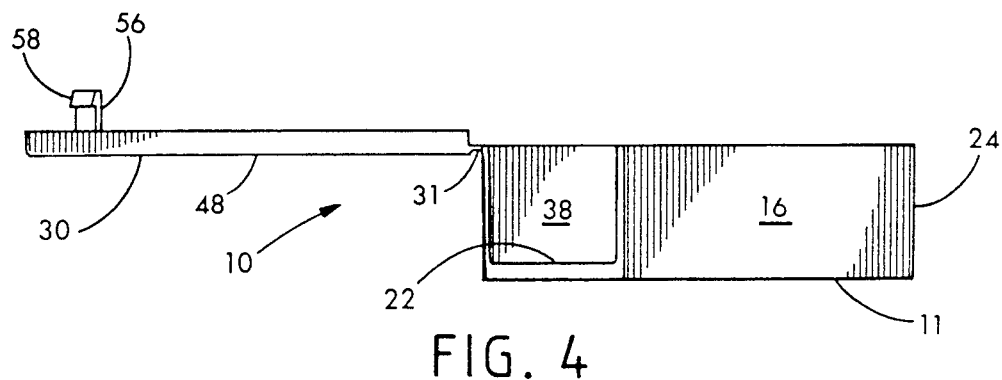
FIG. 4 is a side plan view of the polygonal bait station with the hinged cover being shown in an open position.
Figure 5:
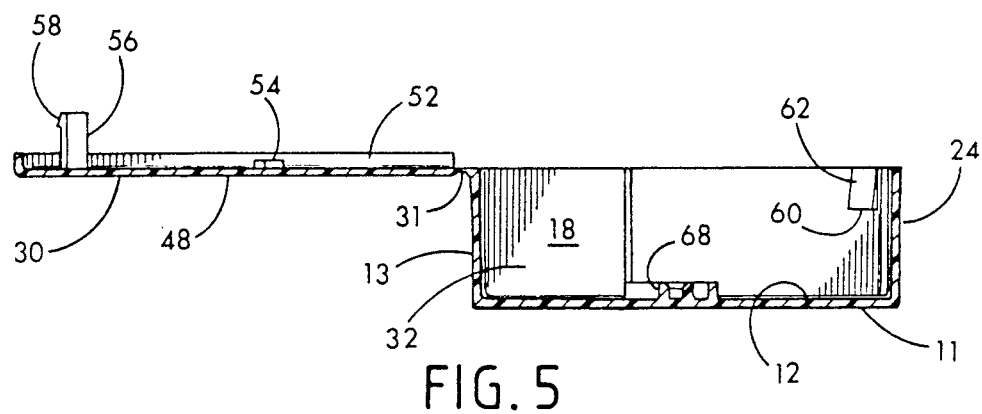
FIG. 5 is a section view taken along section line 5—5 of FIG. 2.
Figure 6:
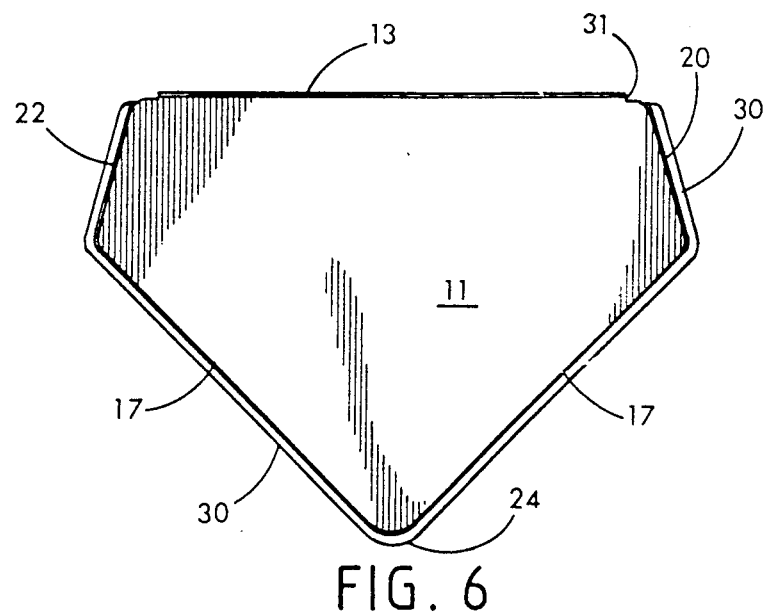
FIG. 6 is a bottom view of the polygonal bait station.

With reference to the drawings, a polygonal bait station is shown at 10 in FIGS. 1-6. The polygonal bait station 10 has a base 11 comprising a floor 12, a first side 13, a second side 15, a third side 17, and threshold portions 20 and 22. The threshold portion 20 is between the first and second sides 13 and 15; the threshold portion 22 is between the first and third sides 13 and 17. The polygonal bait station 10 has a first wall 14, a second wall 16, and third wall portions 18 extending vertically from the base 11. The first wall 14 extends vertically from the base 11 at the side 13; the second wall 16 extends vertically from the base 11 at the sides 15 and 17. A corner 24 is formed at the meeting of the sides 15 and 17, and the second wall 16 wraps around the corner 24. A cover 30 fits over the top of the polygonal bait station 10. The cover 30 is attached to the bait station 10 at a hinge 31 located on the top of the wall 14. The hinge 31 is of a "living hinge" variety. The third wall portions 18 extend vertically from the base 11 parallel to the second wall 16. A bait containment chamber 32 is formed by the area enclosed by the first wall 14, the third wall portions 18, the floor 12, and the cover 30. A passageway 34 is created by the area bounded by the second wall 16, the third wall portions 18, the floor 12, and the cover 30. Pest access entrances 36 and 38 are formed to follow the contour of the threshold portions 20 and 22. Each of the pest access entrances 36 and 38 are bounded by the floor 12, the first and second walls 14 and 16, and the cover 30. An opening 40 to the bait containment chamber 32 is formed between the third wall portions 18, which are in spaced relation, so that the bait containment chamber 32 and the passageway 34 are in communication.

The threshold portions 20 and 22 are angled in a manner that would allow the polygonal bait station 10 to be positioned on the floor or other surface against a straight segment of wall or in a corner at the intersection of two walls. In the polygon shape of the base 11, the first side 13 and the threshold portion 20 preferably meet at a 108° angle; the threshold portion 20 and the second side 15 preferably meet at a 117° angle; the third side 17 and the threshold portion 22 preferably meet at a 117° angle; and the threshold portion 22 and the first side 13 preferably meet at a 108° angle. Since the first wall 14 extends vertically from the first side 13 and the second wall 16 extends vertically from the second and third sides 15 and 17, the first wall 14 and the threshold portion 20 preferably meet at a correspondent 108° angle; the threshold portion 20 and the second wall 16 preferably meet at a correspondent 117° angle; the second wall 16 and the threshold portion 22 preferably meet at a correspondent 117° angle; and the threshold portion 22 and the first wall 14 preferably meet at a correspondent 108° angle. Though the above-named angles are preferable, the angles may be increased or decreased by approximately 10° from the stated angles and remain suitable for use in accordance with the present invention. Therefore, the angle between the first wall 14 and either of the threshold portions 20 or 22 may suitably range between 98° and 118°; the angle between either of the threshold portions 20 or 22 and the second wall 16 may suitably range between 107° and 127°. The corner 24 is a 90° angle to allow for placement in a corner at the meeting of two walls, though it may be rounded for safety, aesthetic, or other reasons. These angles are chosen to optimize the adaptability of the bait station to be placed in different areas and against different wall configurations and enables the user to let the geometry of a room or the particular rodent extermination needs dictate the placement of the triangular bait station 10, rather than the geometry of the bait station dictating a location within the room. The polygonal bait station 10 may also be used in the open when placed upon a floor or other surface.

The pest access entrances 36 and 38 are large enough to allow the entrance of a rodent or similar pest to enter into the bait station 10, but not large enough for a child to insert his or her hand into. The distance between either of the pest access entrances 36 and 38 and the opening 40 to the bait containment chamber 32 should be at least approximately 1¼", which is about the length of a child's finger, thereby making the bait containment chamber 32 and the poisoned bait contained therein out of the reach of the child.

The passageway 34 follows the contour of the second wall 16 and the third wall portions 18 to form a right angle passage, the opening 40 to the bait containment chamber 32 being located at the bend of the right angle. The right angle design of the passageway 34 is simple in construction, and because the pest access entrances 36 and 38 are easily accessed by the rodents through the passageway 34, the rodents are comfortable in their entry since an egress is readily apparent.

The bait station 10 has baffles 42, 44, and 46 that prevent entry of liquids into the bait station 10 which might deteriorate the bait or result in contaminated liquid flowing from the station to the surrounding environment. It is expected that the bait station 10 may be placed in damp places such as basements and the use of the baffles 42, 44, and 46 aid in the protection against bait deterioration and water contamination resulting from exterior water flow. The baffle 42 also serves to retain the bait within the bait containment chamber 32. The baffles 42, 44, and 46 are low enough to not act as any sort of impediment to the passage of a rodent therethrough. Baffle 42 is oriented across the opening 40 to the bait containment chamber 32; baffle 44 is oriented across the width of the passageway 34 in the leg of the right angle originating from pest access entrance 38; and baffle 46 is oriented across the width of the passageway 34 in the leg of the right angle originating from pest access entrance 36.

The floor 12, the walls 14, 16, and 18, and the cover 30 may all be formed of one integral piece. The cover 30 has an exterior surface 50, and is shaped to correspond to the outer perimeter of the bait station 10 formed by the first wall 14, the second wall 16, and the threshold portions 20 and 22. The cover 30 is attached to the first wall 14 by the hinge 14 and has a lip 52 protruding from its interior surface 50 about is periphery that fits over the outside of the second wall 16 when the cover 30 is closed. The cover 30 also has tabs 54 protruding from its interior surface 50 that fit just inside of the second wall 16 when the cover 30 is closed. The lip 52 and the tabs 54 thus assist in the proper alignment of the cover 30 when the cover 30 is closed upon the bait station 10.

Figure 7:
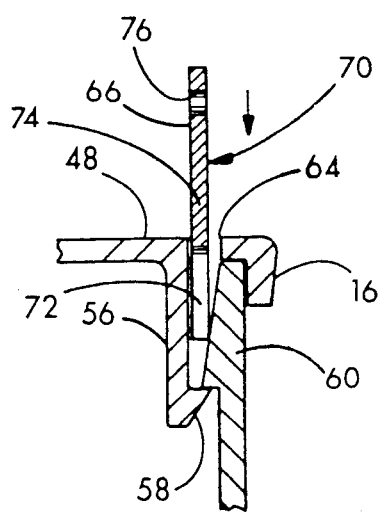
FIG. 7 is a section view through the second wall and the cover, the cover being shown in a closed and locked position to show engagement of one of the barbs of the cover with a ledge on the inside of the second wall, and insertion of a specialized key to liberate the barb from the ledge and unlock the cover, allowing the cover to be pivoted to an open position. The specialized key is shown in a side section view.

The cover 30 also has fingers 56 protruding from the interior surface 50, each of the fingers 56 having barbs 58 that engage with a ledge 60 on the inside of the second wall 16 upon closing of the cover 30 upon the bait station 10. Each of the ledges 60 is formed at the termination of an inclined surface or ramp 62 that has been formed on the inside of the second wall 16. The engagement of one of the barbs 58 of the cover 30 with one of the ledges 60 on the inside of the second wall 16 is depicted in FIG. 7. As is further depicted in FIG. 7, the cover 30 also has rectangular apertures 64 positioned adjacent each of the fingers 56 so that by insertion of a specialized key 70, the respective finger 56 may be driven away from the respective surface or ramp 62 to liberate the barb 58 from the ledge 60. As is visible in FIGS. 1 and 2, there are two sets of a combination finger 56 and barb 58, along with correspondent edges 60 and apertures 64. The sets of fingers 56 and barbs 58 are located near the portion of the cover 30 that fits over the cover 24 and are angularly oriented to each other to latch under the ledges 60 located in the second wall 16 at the point where the second wall 16 wraps around the corner 24.

Figure 8:
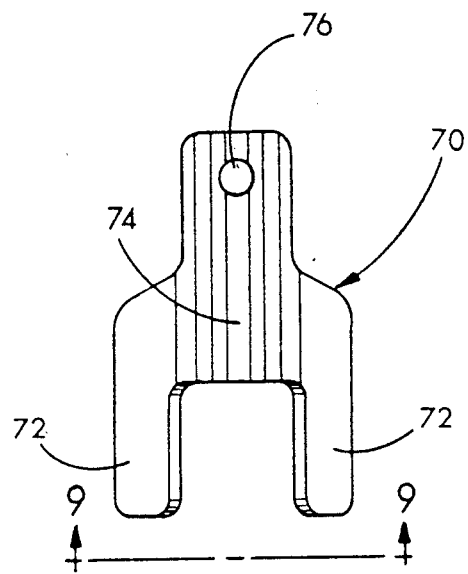
FIG. 8 is a front view of the specialized key used to unlock the cover.
Figure 9:
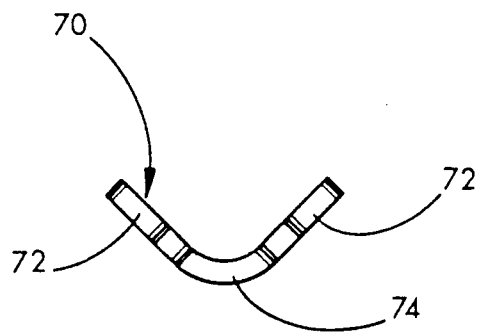
FIG. 9 is a view taken along line 9—9 of FIG. 8.

The specialized key 70 is made of flat stock and has two prongs 72 that are branched from a central member 74. The key 70 also has a hole 76 in the central member 74 for attachment to a keychain or the like. The prongs 72 are each sized, angled, and distanced from each other so as to match the size, angle and distance between the two rectangular apertures 64, so that each of the prongs 72 may be simultaneously inserted into a respective aperture 64. The specialized key 70 is shown in FIGS. 8 and 9. The specialized key 70 is used to open the bait station 10 by liberating both of the barbs 58 from their respective ledges 60 simultaneously. Upon simultaneously liberating of the barbs 58 from their respective ledges 60, the cover 30 is allowed to pivot on the hinge 31 to the open position. Conversely, the cover 30 may be pivoted on the hinge 31 to close the cover 30. The use of a living hinge for the hinge 31 insures the alignment of the barbs 58 and ledges 60 for proper engagement.

The use of multiple barbs 58, correspondent to apertures 64, and the specialized key 70 having prongs 72 that match the apertures 64 is a safety feature in that the bait station 10 cannot be opened if the barbs 58 are not liberated simultaneously. If the barbs 58 are not liberated simultaneously, the barb 58 that is unreleased will re-engage with the respective ledge 60. Thus, the requirement of a specialized key 70 to open the cover 30 renders the bait station 10 tamper-proof. For example, children who manage to insert a slender rod or screwdriver down one of the apertures 64 would therefore not successfully open the cover 30 of the bait station. On the other hand, personnel of pest control companies may be able to open and close the cover 30 and replace bait that may have been consumed by pests by carrying the specialized key 70. Multiple uses of the bait station 10 are allowed in this manner. The cover 30 may also be made to be permanently sealed by elimination of the apertures 64 for use by consumers or non-professional pest controllers would not be inclined to handle or replace the bait.

The bait station 10 and its cover 30 are preferably integrally molded of plastic of any suitable type. The bait station 10 is preferably formed of opaque material; however, it may be instead formed of a translucent material that would enable one to monitor the consumption of the bait contained within the bait station 10. The bait station 10 also has a circumferential ridge 68 located just inside the opening 40 of the bait containment chamber 32. The circumferential ridge 68 is sized and acts as a guide to allow the driving of a nail or screw through the base 11 of the bait station 10, the base 11 being thinner in the region within the circumferential ridge 68 to allow for a more facilitated penetration of a nail or screw therethrough. By driving a nail or screw through the base 11 within the circumferential ridge 68, the bait station 10 is prevented from "wandering" from its intended location. Such wandering may result from, for example, the movement of the pests or by the unintentional kicking of the bait station 10 by humans or pets.

In the use of the bait station 10 of the present invention, a rodent or other pest desired to be exterminated will detect the odor of the bait from the bait station 10 and be lured thereto. As discussed earlier, the bait station 10 may be positioned in a number of alternate locations by the user within the room or other area in which the rodent population is sought to be controlled. The rodent will have equal access to the bait station 10 wherever located. The rodent may enter the bait station 10 through either of access entrances 36 or 38, and upon entry, the rodent would sense easy points of retreat. The rodent then feeds upon the poisoned bait and leaves the bait station to die in another location, thereby not connecting illness of themselves or others to the eaten food.

The polygonal bait station 10 of the present invention provides an inviting and non-threatening lure for rodents because it provides a clear, single-passage entrance and egress. The rodent can feed and look out both entrances at the same time, thus providing apparent wide open access to the bait for the rodent. Despite this ready access to the bait to the pests, the bait containment chamber 32 and passageway 34 serve to shield the bait from inquisitive children and pets. The angled entrances 36 and 38 of the bait station 10, and its general polygonal shape, result in a bait station which is adaptable to various room geometrics and extermination needs. The bait station 10 allows the rodent equally facilitated access whether the bait station is positioned against a corner created by the intersection of two room walls or against a straight segment of wall. The compact size and adaptability of the bait station 10 promote efficiency as well.

Though the bait station 10 is herein depicted as pentagonal, it should be apparent that other various polygonal shapes are contemplated by this invention. It is understood that the invention is not confined to the particular construction and arrangement of parts herein illustrated and described, but embraces such modified forms thereof as come within the scope of the following claims.

What is claimed is:

1. A portable bait station positionable against either a room wall or a corner for luring rodents and similar pests, the bait station comprising:

(a) a polygonal base having a floor;
   (b) walls extending upwardly from the base, the walls including a first wall extending from one side of the base and adapted to fit against a room wall, a second wall having two portions oriented at right angles and extending respectively from two sides of the base and adapted to fit flush against room walls having a right angle corner, each second wall portion terminating at an end which is spaced from an adjacent end of the first wall to define a threshold portion of the base which extends between the adjacent ends of the first and second walls, and third wall portions projecting from the first wall in a direction parallel to adjacent portions of the second wall to define a passageway between the second wall and the third wall portions and a bait containment chamber between the first wall and the third wall portions, the passageway having pest access entrances at the threshold portions extending between the ends of the first and second walls, and the third wall portions terminating in spaced relation to define an opening between the passageway and the bait containment chamber to permit rodents in the passageway to consume bait in the bait containment chamber; and,
   (c) a cover that fits over the upwardly extending walls.

2. The portable bait station of claim 1 wherein the distance from the ends of the first and second walls to the opening between the passageway and the bait containment chamber is at least 1¼ inches.

3. The portable bait station of claim 1 wherein the polygonal base is pentagonal.

4. The portable bait station of claim 1 wherein the passageway has baffles extending from the floor and across the passageway so as to prevent fluid leakage into and out of the bait station and still allow unimpeded passage of the pest through the passageway.

5. The portable bait station of claim 1 further including a baffle extending upward from the floor and across the opening to the bait containment chamber to prevent fluid leakage into and out of the bait station and still allow unimpeded passage of the pest into the bait containment chamber.

6. The portable bait station of claim 1 further including a hinge that attaches the cover to the first wall and thereby allows the cover to pivot along the hinge from an open position where the bait containment chamber and the passageway are exposed to a closed position in which the cover fits over the upwardly extending walls.

7. The portable bait station of claim 1 wherein the base includes a circumferential ridge that acts as a guide for a nail or screw to secure the bait station to the surface on which it rests.

8. The portable bait station of claim 7 wherein the base is thinner within the area of the circumferential ridge to facilitate penetration of a nail or screw therethrough.

9. The portable bait station of claim 1 wherein the base, walls, and the cover are made of one integral piece.

10. The portable bait station of claim 1 wherein the base, walls, and the cover are opaque.

11. The portable bait station of claim 1 wherein the base, walls, and the cover are translucent.

12. A portable bait station positionable against either a room wall or a corner for luring rodents and similar pests, the bait station comprising:
 (a) a polygonal base having a floor;
 (b) walls extending upwardly from the base, the walls including a first wall that is straight and adapted to fit against a room wall, a second wall having two portions oriented at right angles adapted to fit flush against room walls having a right angle corner, and third wall portions projecting from the first wall in a direction parallel to adjacent portions of the second wall to define a passageway between the second wall and the third wall portions and a bait containment chamber between the first wall and the third wall portions, the passageway having pest access entrances at threshold portions extending between the ends of the first and second walls, wherein the angle between the first wall and one of the threshold portions is between approximately 98° and 118°, and the third wall portions terminating in spaced relation to define an opening between the passageway and the bait containment chamber to permit rodents in the passageway to consume bait in the bait containment chamber; and,
 (c) a cover that fits over the upwardly extending walls.

13. The portable bait station of claim 12 wherein the angle between the first wall and one of the threshold portions is 108°.

14. A portable bait station positionable against either a room wall or a corner for luring rodents and similar pests, the bait station comprising:
 (a) a polygonal base having a floor;
 (b) walls extending upwardly from the base, the walls including a first wall that is straight and adapted to fit against a room wall, a second wall having two portions oriented at right angles adapted to fit flush against room walls having a right angle corner, and third wall portions projecting from the first wall in a direction parallel to adjacent portions of the second wall to define a passageway between the second wall and the third wall portions and a bait containment chamber between the first wall and the third wall portions, the passageway having pest access entrances at threshold portions extending between the ends of the first and second walls, wherein the angle between the second wall and one of the threshold portions is between approximately 107° and 127°, and the third wall portions terminating in spaced relation to define an opening between the passageway and the bait containment chamber to permit rodents in the passageway to consume bait in the bait containment chamber; and,
 (c) a cover that fits over the upwardly extending walls.

15. The portable bait station of claim 14 wherein the angle between the second wall and one of the threshold portions is 117°.

16. A portable bait station positionable against either a room wall or a corner for luring rodents and similar pests, the bait station comprising:
 (a) a polygonal base having a floor;
 (b) walls extending upwardly from the base, the walls including a first wall that is straight and adapted to fit against a room wall, a second wall having two portions oriented at right angles adapted to fit flush against room walls having a right angle corner, and third wall portions projecting from the first wall in a direction parallel to adjacent portions of the second wall to define a passageway between the second wall and the third wall portions and a bait containment chamber between the first wall and the third wall portions, the passageway having pest access entrances at threshold portions extending between the ends of the first and second walls, and the third wall portions terminating in spaced relation to define an opening between the passageway and the bait containment chamber to permit rodents in the passageway to consume bait in the bait containment chamber;
 (c) a cover that fits over the upwardly extending walls; and,
 (d) wherein the second wall includes a ledge that faces the passageway, and the cover includes a barb that engages with the ledge to secure the cover in the closed position.

17. The portable bait station of claim 16 wherein the cover includes an aperture through which a key may be inserted to displace and liberate the barb from engagement with the ledge, thereby enabling the cover to be pivoted along the hinge to the open position.

18. The portable bait station of claim 17 wherein there are a plurality of apertures, each accessing a barb that engages with the ledge, the key having a plurality of prongs that correspond to the apertures and are simultaneously insertable into each of the apertures to displace the respective barb from engagement with the ledge, thereby enabling the cover to be pivoted along the hidge to the open position.

19. A bait station for luring rodents and similar pests, the bait station comprising:
 (a) a base;
 (b) walls extending upwardly from the base, the walls being positioned to form a pest access entrance, and being further positioned to form a bait containment chamber within, the entrance and the bait containment chamber being in communication to allow unimpeded passage of a pest into the bait containment chamber; and
 (c) a cover that fits over the upwardly extending walls, the cover being attached at a hinge to one of the upwardly extending walls and the cover being pivotable from an open position where the bait containment chamber is exposed to a closed position in which the cover fits over the upwardly extending walls, the cover including at least two barbs that independently engage with a respective ledge on a surface of the walls to secure the cover in a closed position and the cover having an aperture for each of the barbs such that a key having prongs that are located to correspond to the apertures may have the prongs inserted simultaneously into each of the apertures to liberate each of the barbs from engagement with the respective ledge, thereby enabling the cover to be pivoted along the hinge to the open position.

20. The bait station of claim 19 wherein the hinge is a living hinge.

21. The bait station of claim 19 wherein the base, walls, and the cover are made of one integral piece.

22. A bait station for luring rodents and similar pests, the bait station comprising:
   (a) a base;
   (b) walls extending upwardly from the base, the walls being positioned to form a pest access entrance, and being further positioned to form a bait containment chamber within, the entrance and the bait containment chamber being in communication to allow unimpeded passage of a pest into the bait containment chamber;
   (c) a cover that fits over the upwardly extending walls, the cover being attached at a hinge to one of the upwardly extending walls and the cover being pivotable from an open position where the bait containment chamber is exposed to a closed position in which the cover fits over the upwardly extending walls, the cover including at least two barbs that independently engage with a respective ledge on a surface of the walls to secure the cover in a closed position and the cover having an aperture for each of the barbs; and
   (d) a key that has prongs that are located to correspond to the apertures to liberate each of the barbs from engagement with the respective ledge, thereby enabling the cover to be pivoted to the open position.

23. The bait station of claim 22 wherein the hinge is a living hinge.

24. The bait station of claim 22 wherein the base, walls and the cover are made of one integral piece.

* * * * *